[19] United States Patent
Genske

[11] Patent Number: 5,073,599
[45] Date of Patent: Dec. 17, 1991

[54] FILMS USING BLENDS OF POLYPROPYLENE AND POLYISOBUTYLENE

[75] Inventor: Roger P. Genske, Neenah, Wis.

[73] Assignee: American National Can Company, Chicago, Ill.

[21] Appl. No.: 205,697

[22] Filed: Jun. 13, 1988

Related U.S. Application Data

[60] Division of Ser. No. 114,652, Jan. 11, 1988, Pat. No. 4,892,911, which is a continuation of Ser. No. 803,029, Nov. 29, 1985, abandoned.

[51] Int. Cl.$^5$ .................... C08L 23/16; C08L 23/20
[52] U.S. Cl. ..................................... 525/240; 525/57
[58] Field of Search ......................................... 525/240

[56] References Cited

U.S. PATENT DOCUMENTS

| | | | |
|---|---|---|---|
| Re. 28,688 | 1/1976 | Cook | 260/4 |
| 2,877,206 | 3/1959 | Scott | 260/45.5 |
| 2,993,028 | 7/1961 | Ranalli | 525/240 |
| 2,993,876 | 7/1961 | McGlamery | 260/45.5 |
| 3,192,288 | 6/1965 | Sayko et al. | 260/897 |
| 3,256,367 | 6/1966 | Jayne | 260/897 |
| 3,278,471 | 10/1966 | Rairdon | 260/23 |
| 3,299,174 | 1/1967 | Kuhre et al. | 260/876 |
| 3,424,649 | 1/1969 | Nyberg et al. | 161/253 |
| 3,482,033 | 12/1969 | Kenney et al. | 174/102 |
| 3,572,721 | 3/1971 | Harrison et al. | 372/218 |
| 3,665,059 | 5/1972 | Mahlman | 260/897 A |
| 3,689,595 | 9/1972 | Gwinn | 260/876 B |
| 3,700,614 | 10/1972 | Schenkerberg | 260/23 H |
| 3,701,702 | 10/1972 | Schichman et al. | 156/244 |
| 3,758,643 | 9/1973 | Fischer | 260/897 |
| 3,793,283 | 2/1974 | Frailey et al. | 260/33.6 AQ |
| 3,806,558 | 4/1974 | Fischer | 260/897 A |
| 3,850,474 | 11/1974 | Welch | 296/31 |
| 3,862,106 | 1/1975 | Fischer | 260/80.78 |
| 3,962,018 | 6/1976 | Costemalle et al. | 156/306 |
| 3,993,826 | 11/1976 | Butler et al. | 428/220 |
| 4,104,210 | 8/1978 | Coran et al. | 260/4 R |
| 4,140,162 | 2/1979 | Gajewski et al. | 150/1 |
| 4,189,519 | 2/1980 | Ticknor | 428/476 |
| 4,210,686 | 7/1980 | Gajewski et al. | 428/35 |
| 4,230,767 | 10/1980 | Isaka et al. | 428/349 |
| 4,250,273 | 2/1981 | Bohm et al. | 525/99 |
| 4,275,120 | 6/1981 | Weiner | 428/516 |
| 4,311,808 | 1/1982 | Su | 525/222 |
| 4,322,465 | 3/1982 | Webster | 428/194 |
| 4,350,795 | 9/1982 | Bohm et al. | 525/194 |
| 4,352,849 | 5/1982 | Mueller | 428/213 |
| 4,357,376 | 11/1982 | Nottinger | 428/35 |
| 4,391,862 | 7/1983 | Bornstein et al. | 428/35 |
| 4,423,117 | 12/1983 | Machonis, Jr. et al. | 428/475.8 |
| 4,440,815 | 4/1984 | Zemorodi et al. | 428/35 |
| 4,488,860 | 12/1984 | Joseph et al. | 425/131.1 |
| 4,500,681 | 2/1985 | Shulman | 525/222 |
| 4,528,220 | 7/1985 | Hwo | 428/35 |
| 4,552,714 | 11/1985 | Krueger et al. | 264/171 |
| 4,623,587 | 11/1986 | Ito et al. | 428/335 |
| 4,624,991 | 11/1986 | Haas | 525/209 |
| 4,654,240 | 3/1987 | Johnston | 428/35 |
| 4,764,404 | 8/1988 | Genske et al. | 428/35 |
| 4,769,261 | 9/1988 | Hazelton et al. | 428/35 |
| 4,822,545 | 4/1989 | Kresge et al. | 264/141 |

FOREIGN PATENT DOCUMENTS

| 0654875 | 12/1962 | Canada . |
| 0165791 | 12/1985 | European Pat. Off. . |
| 2821733 | 11/1978 | Fed. Rep. of Germany . |
| 2415056 | 8/1979 | France . |
| 52072744 | 12/1975 | Japan . |
| 54103478 | 8/1979 | Japan . |
| 1168541 | 10/1969 | United Kingdom . |
| 2055688 | 3/1981 | United Kingdom . |

Primary Examiner—Carman J. Seccuro
Attorney, Agent, or Firm—Robert Stenzel

[57] ABSTRACT

Polymeric film which is a blend of about 10% to 65% by weight polyisobutylene and conversely about 90% to 35% by weight of polypropylene copolymer. The polypropylene is preferably a copolymer having about 70 to about 98 mole percent propylene moieties and conversely about 30 to about 2 mole percent ethylene moieties. Preferred films have a blend composition of 20% to 40% by weight polyisobutylene and 80% to 60% by weight polypropylene copolymer. It is also preferred that the polypropylene copolymer is 92 to 98 mole percent propylene moieties and conversely 2 to 8 mole percent ethylene moieties.

4 Claims, 2 Drawing Sheets

FILMS USING BLENDS OF POLYPROPYLENE AND POLYISOBUTYLENE

This is a division of application Ser. No. 114,652, filed 01/11/88, now U.S. Pat. No. 4,892,911; which is a continuation application of Ser. No. 803,029, filed Nov. 29, 1985 and now abandoned.

BACKGROUND OF THE INVENTION

This invention pertains to packaging. It pertains in some respects to compositions of matter and single layer polymeric films made therefrom, and in other respects to multiple layer sheet materials and packages made therefrom. The sheet materials may be entirely polymeric, or they may include non-polymeric components. The multiple layer materials may be flexible, or relatively rigid. The invention also pertains to processes for making packaging materials. This invention is especially concerned with packaging sheet materials which are formed into packages.

Various packaging applications wherein a product is packaged in a heat sealable sheet material require that the finished package be able to withstand substantial abuse, such as in shipping and handling. In some packaging applications, the package, including the packaging materials and the product being packaged, may be subject to certain process treatments either during or after the filling and sealing of the package. One such application is retortable packages, where the package is subjected to sterilizing conditions of typically about 250° F., and appropriate respective pressures for steam sterilization, typically for periods of 30-60 minutes, but sometimes as little as 10 minutes is acceptable.

A multiplicity of packaging materials have been developed for use in heat seal-type packaging. While many of these packaging materials have experienced a degree of success, there remain problems in packages which are subject to certain abuses related to their use. Particularly, packages containing liquid products experience hydraulic pressures exerted by the liquid product when they receive physical shocks such as when dropped, or moved in a rough manner. Where the shock is sufficiently strong, the heat seals may break as a result. And while certain sheet structures are in conventional use, it is desirable to make improved economical sheet structures which can be used to make even stronger packages, and particularly, stronger package sealant layers and seals, to further reduce the incidence of failure of the filled and sealed package. Packaging materials which have been subjected to high temperature processing are particularly susceptible to breakage of the package seals.

Particularly referring, now, to packages which are subjected to thermal processing, as in retort processing typically at about 250° F., sealant layers are known to be made of polypropylene, as in U.S. Pat. No. 4,190,477. While polypropylene sealant layers are functionally capable of withstanding the processing conditions, the heat seals, as measured after processing, could desirably be stronger.

It is an object of this invention to provide novel packaging sheet materials.

It is another object of the invention to provide novel multiple layer sheet materials having improved capability to withstand physical shocks when formed into flexible heat sealed packages filled with liquid, and packages made from those sheet materials.

It is still another object to provide such novel sheet materials having good barrier to transmission of gases or moisture into or out of the package.

It is yet another object to provide novel sheet materials capable of withstanding substantial physical shocks when formed into flexible heat sealed packages filled with liquid; the packages having good barrier to transmission of gases or moisture; and the packages having sufficient optical clarity through the sheet material to enable visual inspection of the package contents; and packages made from those sheet materials.

Further objects are in processes for making the improved sheet materials of the invention, and the packages made therefrom.

SUMMARY OF THE INVENTION

The invention is seen to be embodied in an unsupported polymeric film which is a blend of about 10% to 65% by weight polyisobutylene and conversely about 90% to 35% by weight of polypropylene copolymer. The polypropylene is preferably a copolymer having about 70 to about 98 mole percent propylene moieties and conversely about 30 to about 2 mole percent ethylene moieties. Preferred films have a blend composition of 20% to 40% by weight polyisobutylene and 80% to 60% by weight polypropylene copolymer. It is also preferred that the polypropylene copolymer is 92 to 98 mole percent propylene moieties and conversely 2 to 8 mole percent ethylene moieties.

The preferred process of making the films includes the steps of extruding the blend through a die, and cooling the extruded blend to form a solid. In the process of making the films of the invention, it is entirely acceptable to form a particulate blend of the polypropylene copolymer and the polyisobutylene, where the particles in the blend generally have a size greater than 0.5 micron diameter, and to process the blend by extruding it through a die, followed by cooling the extruded blend to form a solid.

The invention is also embodied in multiple layer sheet materials. In one such sheet material, a first polypropylene-based layer having two opposing surfaces is composed of a polypropylene blend of the invention. The polypropylene used in the blend is preferably a copolymer having 70 to 98 mole percent propylene moieties and conversely 30 to 2 mole percent ethylene moieties. A second layer of a metal foil is affixed on one of the surfaces of the first layer. The first layer is preferably 60% to 80% by weight polypropylene copolymer and 40% to 20% by weight polyisobutylene. In more preferred forms, the polypropylene copolymer in the first layer is 92 to 98 mole percent propylene moieties and conversely 2 to 8 mole percent ethylene moieties. In some embodiments of these sheet materials, the first layer is adhered to the second layer by a polymeric adhesive, the adhesive being between the first and second layers. There are also embodiments of the invention where additional layers are used. In one such embodiment, an abuse resistant layer is adhered to the second surface of the second layer of metal foil by an adhesive layer, namely that surface which is opposite the surface which is adhered to the first blend layer. Exemplary materials for use in the abuse resistant layer are oriented polyamides, oriented polyesters and oriented polypropylenes.

In one family of embodiments, in which the invention is exemplified by the multiple layer sheet material having a first layer of the blend of polypropylene copolymer and polyisobutylene and a second layer of metal foil, it is convenient to adhere the first layer to the second layer by use of an adhesive layer of polypropylene copolymer therebetween. In some cases, it is expedient to include a primer between the second layer and the polypropylene copolymer layer. Preferred primer has carboxy moieties. Further, the layer of polypropylene copolymer includes carboxy moieties in some embodiments.

In another family of embodiments, the invention is exemplified by a multiple layer sheet material having barrier properties provided by polymeric materials. A first layer is of the blend of polypropylene copolymer and polyisobutylene. A second layer of a polyamide having two opposing surfaces is adhered, on one of its surfaces to one surface of the first layer. A third barrier layer having two opposing surfaces is adhered on one of its surfaces to the other surface of the second layer of polyamide. Preferred composition for the third layer is about 50% to about 90% by weight of a first material which is vinyl alcohol copolymer and conversely about 50% to about 10% by weight of a second material which is a polymer compatible with ethylene vinyl alcohol copolymer in blend composition. "Compatible" means the capability for polymers to be extruded in blend composition. A fourth layer of a polyamide, having two opposing surfaces, is adhered on one of its said surfaces to the other surface of the third layer. In some preferred versions of this family of embodiments, the second material in the third layer is polyetheramide block copolymer. For those structures desiring higher levels of adhesion, a layer of an adhesive polymer may be interposed between the first and second layers. Finally, a fifth layer of biaxially oriented nylon may be adhered to the other surface of the fourth layer.

Within the family of embodiments having barrier properties provided by polymeric materials, one subfamily uses as the barrier layer a second layer comprised of vinylidene chloride copolymer. The second layer has two opposing surfaces and is adhered to the first layer on one of its surfaces by a third layer of an adhesive therebetween. A fourth layer of a polyamide may be adhered to the other surface of the second layer by a fifth layer of an adhesive therebetween.

The various films and sheet materials of the invention are susceptible to being made into packages by the formation of seals about an enclosed area, to effect the closing and sealing of the packages.

The processes for making films and sheet materials of the invention include the formation of blends of polypropylene copolymer and polyisobutylene using particles generally larger than 0.5 micron. The particulate blend is then extruded or coextruded to form the films of the invention.

DETAILED DESCRIPTION OF THE ILLUSTRATED EMBODIMENTS

Figure 1:
FIG. 1 is a cross-section of a single layer film of this invention.

The invention is first seen in a single layer 12 of film of generally indefinite length. A cross-section of a piece of such a film is seen in FIG. 1. The film is a blend of about 10% by weight to about 65% by weight polyisobutylene and conversely about 90% to about 35% by weight polypropylene copolymer. The polypropylene copolymer is especially selected to contain about 70 to about 98 mole percent propylene moieties and conversely about 30 to about 2 mole percent ethylene moieties. The overall blend composition has at least about 1.8 mole percent ethylene. In the resulting blend compositions, the ratio of propylene moieties to isobutylene moieties is thus between about 0.3/1 and about 6.6/1.

Figure 2:
FIG. 2 is a cross-section of a two-layer sheet material of the invention, using a metal foil layer.
Figure 3:
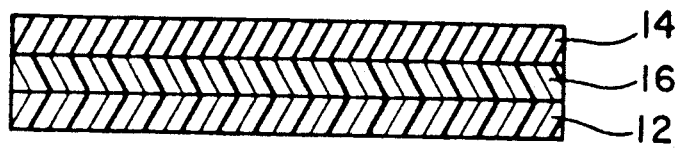
FIG. 3 is a cross-section of a three-layer sheet material of the invention, using a metal foil layer.

FIGS. 2 and 3 show the invention as it is used in simple multiple layer sheet structure wherein a layer of metal foil is joined to the blend layer. In the structure of FIG. 2, the foil layer 14 is adhered directly to the blend layer 12 without the use of intervening adhesives. In FIG. 3, a third adhesive layer 16 is used to promote improved adhesion between layers 12 and 14.

Figure 4:
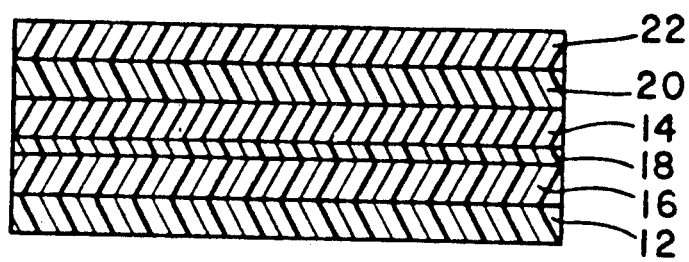
FIG. 4 is a cross-section of a six-layer sheet material of the invention, using a metal foil layer.

FIG. 4 illustrates a more complex form of sheet structures of the invention which include therein a layer of metal foil. The FIG. 4 structure includes the same layers 12, 14, and 16 as in FIG. 3. In addition, it shows an optional primer layer 18 between layers 14 and 16. An abuse resistant layer 22 is adhered to foil layer 14 by an intervening layer 20.

Figure 5:
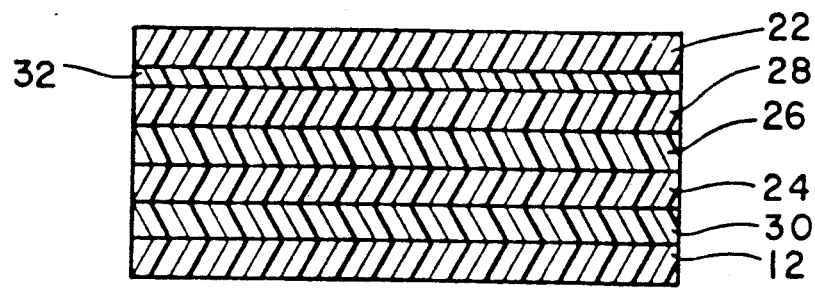
FIG. 5 is a cross-section of a seven-layer sheet material of the invention, and wherein the composite sheet structure may have optical clarity for visual inspection through the sheet material.

FIG. 5 illustrates a multiple layer polymeric barrier film of the invention. In this embodiment, an adhesive layer 30 is adhering a nylon layer 24 to the blend layer 12. A barrier layer 26 includes ethylene vinyl alcohol copolymer (EVOH) for reducing transmission of gases through the film. Nylon layer 28 is adjacent EVOH layer 26. Optional abuse resistant layer 22 is adhered to nylon layer 28 for the purpose of providing further physical protection of the overall film.

Figure 6:
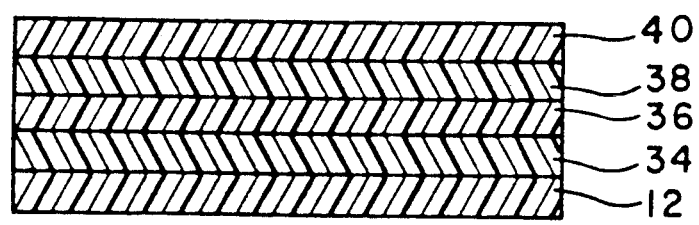
FIG. 6 is a cross-section of a five-layer sheet material of the invention, and wherein the composite sheet material may have optical clarity for visual inspection through the sheet material.

FIG. 6 shows another embodiment of a multiple layer barrier film which uses, as a barrier, a layer 36 of vinylidene chloride copolymer. In this illustrated embodiment, layer 12 is the blend layer, layer 36 is a barrier layer of vinylidene chloride copolymer and layer 40 is a layer of nylon. Intervening layers 34 and 38 are adhesives functional to hold the respective layers to each other, and functional to hold the structure together as a whole.

It is entirely possible to incorporate the invention, including any of the embodiments herein, as a substructure, into other structures. Similarly, additional layers may be added to the structures disclosed herein without departing from the contemplated scope and intent of the invention.

THE BLENDS

The blends of layer 12 have two essential components. The first component is polyisobutylene. The second component is polypropylene copolymer. The inventor has found that it is critical that the polypropylene component contain some ethylene in order to impart to the overall blend composition the desired degree of shock resistance. The polypropylene component of the blend may be all copolymer or a blend of copolymer and homopolymer. The recitation of polypropylene copolymer hereinafter includes blends of copolymer and polypropylene homopolymer. While blends of polypropylene and polyisobutylene may be made using polypropylene homopolymer, and heat sealable sheet materials may be made therefrom, those sheet materials exhibit less shock resistance than the structures of the invention.

With the inclusion of as little as about 1.8 mole percent ethylene in the propylene component, improvement is seen in the shock resistance of packages made therefrom. As the amount of ethylene is increased, the shock resistance generally improves, and up to about 30 mole percent ethylene may be used. As the amount of ethylene is increased, the capability of the blend to withstand heat (heat resistance) is decreased. At the higher fractions of ethylene content, the heat resistance is less than desired for some uses. Thus, for those uses in which the packaging sheet material is required to have high heat resistance, an ethylene content of about 2 to about 8 mole percent is preferred in the polypropylene copolymer, and the presence of at least about 2 mole percent is necessary as a condition in this invention.

Since the various polymeric layers in the invention are intended to be used primarily in extrusion process through a slot die, it is significant that each material be obtained in such a form as is readily conducive to its use in the extrusion process, and that it be obtained at economically favorable cost. As is well known polyisobutylene is commercially supplied in the form of large blocks, or bales. In order to prepare polyisobutylene for extrusion, it is thus necessary to convert it to another form. Conversion of polyisobutylene into pellets is not known to have been done. Its rubbery physical characteristics may prevent its being prepared in pellet form, as is, for example, the polypropylene copolymer. The polyisobutylene may be melted from the bale and blended with a polypropylene, either copolymer or homopolymer, to form a master batch of a blend of polyisobutylene and polypropylene. The so-formed master batch may be formed into conventional pellets for use in extruding the blends of this invention to form layers. In making the final blends for use herein, the master batch pellets may be blended with additional polypropylene, which must include copolymer, to make the desired blend ratio of polyisobutylene to polypropylene.

The preparation of a master batch by melt mixing together polyisobutylene with polypropylene copolymer to form a blend is seen as significant to the desired objective of economically forming a film from a blend of polyisobutylene and polypropylene copolymer. While a master batch may be so blended as to yield a blend composition as desired for forming a film, it is usually preferred to form a master batch having a lower polypropylene content and to form it into conventional pellets suitable for extrusion. This minimizes both the cost of making the master batch and the thermal exposure of the polypropylene. The final desired blend composition is economically achieved by dry blending a pre-determined amount of the master batch pellets with a pre-determined amount of polypropylene copolymer pellets and extruding the mixture, thus achieving the desired final blend composition in the extruded layer.

In typical formation of blend layers in the invention, a master batch is compounded by melting polyisobutylene and mixing into the melt an amount of polypropylene, preferably pellets, sufficient to make a blend of 65% by weight polyisobutylene and 35% polypropylene. The blend is heated sufficiently to melt all the polypropylene, and is mixed thoroughly. The melted master batch blend is then formed into pellets and cooled. In formation of the final composition, pellets of the master batch are mixed with pellets of a selected polypropylene copolymer. A typical blend ratio with the above-mentioned master batch is 42% by weight polypropylene copolymer and 58% by weight master batch. The final composition is thus 37.7% polyisobutylene and 62.3% polypropylene, including the polypropylene in the master batch. Where the selected polypropylene copolymer is, for example 4% ethylene, and it is used for both the blend component and in the master batch, the overall content of the blend is 2.5% ethylene.

The blends used in the invention may be compounded in the melted mixture of the master batch in the desired final blend ratio to be extruded. When the desired final blend is thus made as the master batch, the compounded pellets may be extruded without further addition, as of pellets of polypropylene copolymer. While this process, which eliminates a step of dry blending, does produce acceptable blends for use in the invention, where the at least 1.8 percent ethylene is present in the form of polypropylene copolymer, the cost of processing the additional polypropylene in the melt compounding operation usually exceeds the cost of the eliminated dry blending step. Thus, the two step process is usually preferred in preparing material for extrusion processing.

THE MULTIPLE LAYER MATERIALS

The blends described above have preferred utility when used with additional layers. The additional layers may be polymeric or non-polymeric. Conventional additives and fillers may be used. Normal amounts of additives and modifiers may be included in the blend layer 12.

In the formation of the sheet material of FIG. 2, it is desirable to select, for inclusion in the blend composition of layer 12, a polymer having carboxy modifications thereto, to enhance adhesion between blend layer 12 and metal foil layer 14. Carboxy modified propylene polymers are available from Mitsui Company, Japan as "QF" series polymers.

Another way of obtaining adhesion between layers 12 and 14 is through a separate layer of adhesive as at 16 of FIG. 3. A relatively thin layer of adhesive may be used, such as 2 to 3 pounds per 3000 square foot ream. Various adhesives are conventionally known for use in adhesion to metal foil, as in layer 14. Exemplary of these adhesives, for use in layer 16 are the curing type polyester urethane adhesives. One such acceptable adhesive is available from Morton Chemical Company as Adcote 506-40. The adhesive layer 16 may be in direct contact with the foil layer 14, or a primer layer, as at 13 in FIG. 4 may be interposed between foil layer 14 and adhesive layer 16. The primer layer 18, when used, is only of sufficient thickness to ensure its continuity. A suitable primer is Morprime from Morton Chemical Company, a modified polypropylene provided in a liquid carrier. The liquid primer is conveniently applied to the surface of the metal foil layer 14, and the liquid removed by evaporation.

The primer may then be cured by application of heat. Finally, the adhesive layer 16 and blend layer 12 are applied to the primed foil layer 14, preferably with pressure to promote adhesion between the several and respective layers in the composite structure of layers 12, 14, 16 and 18.

In completion of the structure shown in FIG. 4, an abuse resistant layer 22 may be adhered to the other surface of foil layer 14 by use of an adhesive layer 20. Materials conventionally known for their abuse resistance properties, such as oriented nylon, oriented polyester and oriented polypropylene, are satisfactory. Conventional adhesives are known for adhering the abuse resistant materials to metal foil. The adhesive selected will, of course, depend on the selection of the abuse resistant layer. In one such combination, a layer 22 of biaxially oriented nylon is adhered to foil layer 14 by a curing-type polyester urethane adhesive.

The metal foil layer 14 in the embodiments of FIGS. 2, 3, and 4 provides excellent barrier to transmissions of gases and light through the sheet structure. There are, however, applications for sheet materials where the use of metal foil is not desirable. FIGS. 5 and 6 illustrate multiple layer films having polymeric layers that provide barrier to gaseous transmissions through the films.

In the structures of FIG. 5, layer 12 is the polyisobutylene-polypropylene copolymer blend. Layers 24 and 28 are nylon. Layer 26 is EVOH or a blend of EVOH. Layer 30 is an adhesive effective to bond layers 12 and 24 into the structure. Layer 22 is an abuse resistant layer, adhered to nylon layer 28, optionally through use of an adhesive layer 32. Layers 24 and 28 preferably contain nylon 6 and may contain other polyamide polymers. Other nylons may be substituted for nylon 6 where heat resistance is not critical. While layer 26 may be EVOH, a preferred composition for layer 26 is a blend of 50% by weight to 90% by weight of a first polymer of EVOH and 50% by weight to 10% by weight of a second polymer compatible with EVOH in blend composition. The second polymer may be selected with a substantial degree of freedom, and initial determination of suitability of any given polymer is dependent primarily on its compatibility in blend composition with EVOH. Among the suitable choices for the second polymer are ethylene ethyl acrylate, ethylene acrylic acid, linear low density polyethylene, ionomer, anhydride modified low density polyethylene, anhydride modified medium density polyethylene, anhydride modified high density polyethylene, nylon, and polyetheramide block copolymer. The selection of the specific material for the second polymer will, of course, depend on the composition and use of the overall multiple layer structure. With the disclosure herein, expedient selection of the second polymer can be made by those of average skill in the art.

Adhesive layers 30 and 32 may conveniently be polyester urethane, and the structure may conveniently be formed by adhesive lamination techniques. In formation by adhesive lamination, three separate substructures may initially be formed. The first substructure is the blend layer 12 which is formed by extrusion as for the single layer film of FIG. 1, the second substructure is the three layer substructure/nylon/EVOH/nylon/ of layers 24, 26, and 28. This three layer substructure is conveniently formed by conventional coextrusion. The third substructure is the abuse resistant layer 22, which is typically formed by conventional extrusion and which is usually followed by molecular orientation. After the three substructures are formed, they may be combined by conventional lamination processes. They may alternatively be combined by other processes such as extrusion lamination processes.

In another process for making multiple layer films as in FIG. 5, layers 12, 30, 24, 26 and 28 may be coextruded as a first substructure. Layer 22 is separately prepared as above. Layer 22 is joined to layer 28 by conventional method.

Another family of multiple layer structures of the invention is illustrated in FIG. 6. Layer 12 is the blend layer. Layer 36 is a vinylidene chloride copolymer. Preferred copolymers for layer 36 are vinyl chloride-vinylidene chloride copolymers and vinylidene chloride methylacrylate copolymers. Layer 40 is nylon. Layers 34 and 38 are adhesives which adhere together the several layers of the structure. The structure is typically formed by separately forming layers 12, 36 and 40 by individual extrusion processes. The composite multiple layer structure is then assembled by conventional combining process, such as adhesive lamination, extrusion lamination or the like.

Other combinations of conventional processes can be used to form the structures of the invention, and will now be obvious to those skilled in the art.

Sheet materials such as those illustrated in FIGS. 5 and 6 may be formed from materials, each of which offers substantial optical transparency. The finished sheet materials represented by FIGS. 5 and 6 also typically have sufficient optical clarity through the sheet material to enable visual inspection of the package contents. Other structures of the invention which do not use opaque materials such as metal foil, paper or fillers, also typically offer the same optical clarity.

Flexible packages, of the pouch type, may be made from any of the single or multiple layer sheet materials of the invention using conventional processes to form heat seals about an enclosed area defined by facing portions of the sheet material. The sheet materials may also be used in combination with other packaging structures. Sheet structures may, for example, be used as lid materials for rigid trays formed from other packaging structure.

EXAMPLE 1

Pellets of polypropylene copolymer, containing 4% ethylene are mixed with pellets of a master batch which consists of 65% polyisobutylene and 35% polypropylene copolymer, where the polypropylene copolymer used in the master batch contains 4% ethylene. The mixture is 58% by weight pellets of the master batch and 42% pellets of the polypropylene copolymer yielding a blend which is 37.7% polyisobutylene, 59.8% propylene and 2.5% ethylene. The mixture is extruded through a slot die to form a single layer film 4 mils thick. The so-prepared film is laminated to one surface of a layer of 35 gauge aluminum foil using a polyester urethane adhesive. The other surface of the foil is laminated to a layer of 60 gauge biaxially oriented nylon, using a polyester urethane adhesive.

EXAMPLE 2

A sheet structure is prepared as in EXAMPLE 1 except that the polypropylene used to make the master batch is a homopolymer.

COMPARATIVE EXAMPLE 1

A sheet structure is prepared as in EXAMPLE 1 except that the layer comparable to the blend layer in EXAMPLE 1 is polypropylene copolymer, without any polyisobutylene.

COMPARATIVE EXAMPLE 2

A sheet structure is prepared as in EXAMPLE 2 except that the polypropylene blended with the master batch is a homopolymer.

EXAMPLE 3

A single layer film is prepared for the blend layer as in EXAMPLE 1. A three-layer substructure is prepared by coextruding an EVOH layer as a core layer with outer layers of nylon, to form a substructure of the nature of /nylon/EVOH/nylon/. The three-layer substructure is then laminated to the blend layer using a polyester urethane adhesive.

EXAMPLE 4

A five layer film is prepared by coextruding through a combining die a structure of /nylon/EVOH/nylon-/adhesive/blend/. The blend layer is the same mixture as was prepared by mixing pellets for extrusion in EXAMPLE 1. The adhesive material is QF500X, for Mitsui Company, Japan. In the finished film, the blend layer is 4.0 mils thick. The EVOH layer is 0.5 mil thick. The nylon layers are 0.25 mil thick. The adhesive is minimal thickness for continuity, about 0.1 mil.

EXAMPLE 5

A single layer film is prepared for the blend layer as in EXAMPLE 1. The blend layer is laminated to one surface of a layer of biaxially oriented vinylidene-chloride copolymer using a polyester urethane adhesive having an aliphatic chain catalyst. A layer of 60 gauge biaxially oriented nylon is laminated to the other surface of the vinylidene chloride copolymer using the same polyester urethane adhesive.

EXAMPLE 6

A multiple layer sheet material is made as in EXAMPLE 1 except that the ratio of the mixture of pellets in the blend layer is 30% by weight pellets of the master batch and 70% pellets of the polypropylene copolymer. The resulting blend composition is 19.5% polyisobutylene and 80.5% polypropylene copolymer.

The sheet materials of EXAMPLE 1 and EXAMPLE 2 and Comparative Example 1 are used to make heat sealed packages containing about 100 fl. oz. of water. The edge seals are ⅜ inch wide. The packages are then retort processed at 250° F. and about 25 psig pressure for 30 minutes. The retort processed packages are cooled to room temperature. A test package is then placed in a simulated shipping container. A flat, uniform weight is placed on top of the package; a 14 lb. weight to simulate stacking the packages 3 high, or a 35 lb. weight to simulate stacking the packages 6 high.

The shipping containers were then dropped onto a hard surface from various heights at 6 inch intervals. Each package was subjected to one drop from a selected height. After the drop, each package was inspected for weakening or failure at the seal area. In general, six drops were made of six packages at each height reported. In some cases, the package seals were substantially weakened, as evidenced by stretching, or narrowing of the seal width though no leakage occured. These weakened packages were counted as failures. The results of all the tests are seen in Table 1.

TABLE 1

| Sample Identification | Drop Height Survived Without Package Failure | |
|---|---|---|
| | 14. lb. top load | 35. lb. top load |
| Example 1 | all survive at 24 inches | all survive at 6 inches |
| Example 2 | all survive at 18 inches | all fail at 6 inches |
| Comparative Example 1 | 60% fail at 24 inches all fail at 6 inches | — all fail at 6 inches |

The results show that the packages in EXAMPLE 1 and EXAMPLE 2 are significantly better than the packages of Comparative Example 1 wherein the blend layer does not contain polyisobutylene. Further, packages of EXAMPLE 1 tend to be somewhat better than those of EXAMPLE 2 wherein the packages of EXAMPLE 2 contain more homopolymer polypropylene component by virtue of the homopolymer in the master batch.

Thus it is seen that the invention provides novel sheet materials having improved capability to withstand physical shocks when formed into flexible heat sealed packages filled with liquid, and packages made from those sheet materials.

It is further seen that the sheet materials and packages of the invention provide good barrier to transmission of gases into or out of the package. Certain of the sheet materials and packages have good optical clarity through the sheet material, enabling visual inspection of the contents.

Processes are also provided for making the improved sheet materials of the invention.

I claim:

1. In a polymeric film comprising polypropylene and polyisbutylene wherein the improvement comprises said film being unstretched and consisting essentially of a blend which consists essentially of 19.5 to 40% by weight polyisobutylene and 80.5 to 60% by weight of a polypropylene copolymer having 70 to 98 mole % propylene moieties and 30 to 2% ethylene moieties, with the overall composition of the blend having at least about 1.8 mole % ethylene.

2. In the polymeric film of claim 1 wherein the polypropylene copolymer has 92 to 98 mole % propylene moieties and 8 to 2 mole % ethylene moieties.

3. In the polymeric film of claim 1 where in the blend contains 37.7% by weight polyisobutylene, 59.8% by weight propylene moieties and 2.5% by weight ethylene moieties.

4. In the polymeric film of claim 1 wherein the blend consists essentially of 19.5% by weight polyisobutylene and 80.5% by weight of the polypropylene copolymer.

* * * * *